United States Patent
Brown

(10) Patent No.: US 6,827,923 B1
(45) Date of Patent: Dec. 7, 2004

(54) PROCESS FOR THE PRODUCTION OF ALUMINUM HYDROXIDE OF IMPROVED WHITENESS

(75) Inventor: Neil Brown, Bergheim (DE)

(73) Assignee: Albemarle Corporation, Baton Rouge, LA (US)

( * ) Notice: Subject to any disclaimer, the term of this patent is extended or adjusted under 35 U.S.C. 154(b) by 378 days.

(21) Appl. No.: 10/110,301

(22) PCT Filed: Oct. 16, 2000

(86) PCT No.: PCT/EP00/10140

§ 371 (c)(1),
(2), (4) Date: Jun. 4, 2002

(87) PCT Pub. No.: WO01/28926

PCT Pub. Date: Apr. 26, 2001

(30) Foreign Application Priority Data

Oct. 19, 1999 (EP) .............................. 99120676

(51) Int. Cl.$^7$ ................................ C01F 7/00
(52) U.S. Cl. ...................... 423/629; 423/127
(58) Field of Search ................. 423/629, 127

(56) References Cited

U.S. PATENT DOCUMENTS

| | | | | |
|---|---|---|---|---|
| 4,225,639 A | * | 9/1980 | Matyasi et al. | 427/372.2 |
| 4,670,231 A | * | 6/1987 | Garcia-Clavel et al. | 423/127 |
| 5,342,485 A | * | 8/1994 | Armbrust, Jr. | 162/181.5 |
| 6,162,413 A | * | 12/2000 | Fujiwara et al. | 423/625 |

\* cited by examiner

Primary Examiner—Steven Bos
(74) Attorney, Agent, or Firm—Jeffrey S. Melcher; Manelli Denison & Selter, PLLC

(57) ABSTRACT

Aluminium hydroxide of high whiteness is produced by (i) heating aluminium hydroxide obtained from the Bayer process to a temperature of 300 to 700° C. (ii) dissolving the soluble fraction of the thus obtained activated product at 85 to 275° C. in aqueous sodium hydroxide to form a sodium aluminate liquor containing an undissolved residue of very fine boehmite, (iii) filtering said sodium aluminate liquor to obtain a clear solution of sodium aluminate supersaturated with respect to dissolved alumina, (iv) cooling said clear solution to 50 to 80° C. and seeding with crystallized aluminium hydroxide to induce further crystallization, and (v) separating, washing and drying the produced aluminium hydroxide crystals.

3 Claims, No Drawings

PROCESS FOR THE PRODUCTION OF ALUMINUM HYDROXIDE OF IMPROVED WHITENESS

The invention relates to a method for the production of aluminium hydroxide of improved whiteness, especially for application as a filler in paper and plastics.

Aluminium hydroxide (Al(OH)$_3$, ATH) is usually produced by the Bayer process, starting from bauxite. The formation of aluminium hydroxide takes place by seeded crystallization from sodium aluminate solution using previously crystallized aluminium hydroxide as seed crystals. The aluminium hydroxide crystals produced are generally very coarse (average size ca. 100 μm) and most of the aluminium hydroxide produced is subsequently calcined to aluminium oxide (Al$_2$O$_3$, alumina) at temperatures in excess of 1000° C.

Most bauxites contain impurities, namely different minerals and organic matter from extraneous soil and vegetation. These may detract from the properties and discolour the aluminium hydroxide produced. The colour of such aluminium hydroxide is generally of little significance if it is caused by carbonaceous material derived from the organic carbon present in the starting bauxite, as any carbonaceous material is eliminated by oxidation during the calcination step.

The intermediate aluminiumn hydroxide however is also used as an industrial product in its own right, e.g., as pigment and/or fire retardant filler in paper, plastics and rubber compounds. Particularly in paper and plastics it is desirable to have the aluminium hydroxide crystals in a high whiteness form which does not impart any unwanted colouration to the end products. To produce white aluminium hydroxide crystals, special approaches are necessary. These generally involve the prior removal of contaminating organic compounds from the Bayer process liquor to render it virtually 'water clear'. Some of these approaches are as follows:

High pressure/high temperature oxidation of the organic compounds using elemental oxygen. This can eliminate coloured organics but increases the carbonate content of the liquor which then requires an additional purification step.

Destruction of the organic contaminants by high temperature (>1000° C.) liquor calcination and subsequent redissolution of the calcinate in water to give a colourless solution of sodium aluminate.

Crystallizing aluminium hydroxide from a water-clear sodium aluminate results in a product having not only a very high whiteness (reflectivity), for example in paper coating applications, but also no tendency to impart unwanted colour to synthetic resins, especially the unsaturated polyester type used in the production of synthetic marble products However, the currently available methods of achieving a water-clear sodium aluminate liquor are both energy intensive and expensive. Therefore, it was an object of the present invention to provide a more cost effective method for producing aluminium hydroxide of the required high whiteness and virtually free of coloured organics.

It has been found that by heating standard aluminium hydroxide obtained by the Bayer process having an average particle size of 20 to 200 microns to a temperature of 300 to 700° C., preferably 350 to 450° C., most of the organic contaminants (typically 60 to 70 wt % of the organic carbon content) are destroyed and that the resulting 'activated' product, which is largely X-ray amorphous and contains variable amounts of crystalline boehmite, has a high solubility in aqueous sodium hydroxide even at relatively low temperatures. This results in sodium aluminate liquor having a molar ratio of Na$_2$O:Al$_2$O$_3$ of 1.40 to 2.40, preferably 1.45 to 2.25 being obtainable without using hydrothermal conditions, i.e., at 85 to 105° C. Though not preferred, dissolution can also take place in an autoclave under hydrothermal conditions, the temperature thereby ranging up to 275° C. The boehmite content remains largely undissolved in form of very fine particles having a specific surface area of at least 10 m$^2$/g, typically in excess of 50 m$^2$/g. These superfine boehmite particles act as an adsorbent, thus eliminating most of the remaining impurities from the liquor by adsorption prior to and during the filtration step. Subsequently, the recovered boehmite particles may be utilized as starting material in alumina production or in other applications where the adsorbed impurities are not detrimental.

After filtration, the resulting water-clear liquor, which is supersaturated with respect to dissolved alumina, is cooled to 50 to 80° C. and seeded with previously crystallized aluminium hydroxide to induce crystallization of high whiteness product which is separated from the spent liquor by filtration or. The spent liquor does not accumulate organics so that it may be recycled without requiring a liquor purification step.

Thus, high whiteness aluminium hydroxide virtually free of organics can be produced from an inexpensive standard aluminium hydroxide by a relatively inexpensive process. Moreover, the seed crystals used in the process do not necessarily have to be superwhite themselves if further crystallization is essentially confined to crystal growth which will 'cover' the off-white seed crystals with aluminium hydroxide of high whiteness. In the last process steps, the produced aluminium hydroxide crystals are washed and dried according to methods known in the art.

The heating step is preferably conducted at a temperature of 350 to 450° C. for a time sufficient to obtain an activated aluminium (hydr)oxide having a weight loss on ignition of 5 to 15%.

The invention is further illustrated by the following non-limiting examples.

EXAMPLE 1

150 g of a standard aluminium hydroxide from the Bayer process (average particle size ca. 100 μm, whiteness 78%, organic carbon content 0.025 wt. %) was heated to 375° C. for 30 min in an oven. The properties of the product were as follows: whiteness 86%, organic carbon content 0.008 wt. %, specific surface area 280 m$^2$/g, weight loss on ignition (1000° C./2 h) 9.5%. According to X-ray analysis, the product consisted of 27 wt. % of crystalline boehmite with the remainder being largely X-ray amorphous. This 'activated' material was then added to 500 ml of 5 N aqueous sodium hydroxide and heated at 95° C. for 4 h to dissolve the alumina content and to reach a molar ratio (Na$_2$O:Al$_2$O$_3$) of ca. 1.48. The Na$_2$O concentration of the sodium aluminate liquor was 140 g/l and the Al$_2$O$_3$ concentration was at 150 g/l. The boehmite content of the material remained undissolved and was separated by filtration, washed and dried. The boehmite recovered weighed 28 g, had an average particle size of ca. 2 μm and a specific surface area of 60 m$^2$/g.

The supersaturated sodium aluminate liquor was cooled to ca. 60° C., seeded with 2 g/l of finely milled aluminium hydroxide (average particle size ca. 2 μm, specific surface area 8 m$^2$/g) and crystallization allowed to take place for a period of 32 h. The product crystals were then filtered off, washed and dried. The yield was 102 g aluminium hydroxide per liter of liquor. The product crystals had an average particle size of ca. 1.5 μm, a specific surface area of 4 m²/g and a whiteness (according to DIN 53163) of 98% (as compared with 95–96% whiteness obtainable by crystallization from a 'standard' Bayer process liquor), the whiteness measurement being made with a Zeiss Elrepho photometer (filter wavelength 457 nm). The spent liquor had a $Na_2O$ content of 145 g/l and an $Al_2O_3$ content of 86 g/l.

EXAMPLE 2

100 g of a standard aluminim hydroxide from the Bayer process (average particle size ca. 600 μm, whiteness 87%, organic carbon content 0.008wt. %) was heated to 400° C. for 60 min in an oven. The properties of the product were as follows: whiteness 90%, organic carbon content 0.002 wt. %, specific surface area 250 m²/g, weight loss on ignition (1000° C./2 h) 8.7%. According to X-ray analysis, the product consisted of 19 wt. % of crystalline boehmite with the remainder being X-ray amorphous.

This 'activated' material was then added to 500 ml of 5 N aqueous sodium hydroxide and heated to 95° C. for 4 h to dissolve the alumina content and to reach a molar ratio ($Na_2O:Al_2O_3$) of ca. 2.2. The $Na_2O$ concentration of the sodium aluminate liquor was 140 g/l and the $Al_2O_3$ concentration was at 105 g/l. The boehmite content of the material remained undissolved and was separated by filtration, washed and dried. The boehmite recovered weighed 17 g, had an average particle size of ca. 2 μm and a specific surface area of 55 m²/g.

The sodium aluminate liquor was cooled to 75° C., seeded with 50g/l of milled aluminium hydroxide (average particle size 10 μm, whiteness 94%, specific surface area 2.4 m²/g) and crystallization allowed to occur for a period of 8 h at 75° C. followed by a further 24 h at 60° C. The product crystals were then filtered off, washed and dried. The yield was 80 g aluminium hydroxide per liter of liquor (i. e., 25 g of seed +15 g of additional crystallized material). The product crystals had an average particle size of ca. 11 μm, a specific surface area of 1.2 m²/g and a whiteness (according to DIN 53163) of 96%.

The spent liquor had a $Na_2O$ content of 142 g/l and an $Al_2O_3$ content of 70 g/l, i.e., molar ratio 3.3.

EXAMPLE 3

The product from Example 2 was tested in water clear polyester resin Synolite® A-421 of DSM-BASF Structural Resins for viscosity and colour of the cured part. For comparison, the same series of measurements were made of viscosity and colour using the starting material, Martinal® ON-310, produced under standard Bayer conditions.

Viscosity measurement conditions:
170 parts of aluminium hydroxide per 100 parts of resin, Brookfield HBT viscosimeter, spindle 2, 50 min⁻¹ at 23° C.

| Viscosity results: | |
| --- | --- |
| Product of invention | 2600 mPa · s |
| Martinal ® ON-310 | 4300 mPa · s |

The resin/aluminium hydroxide mixes were cured at room temperature using a cobalt accelerator and cast into the form of discs 5.5 cm in diameter and 0.5 cm thick. The colour measurements werde made with an Elrepho 2000 calorimeter. The results were as follows:

| | Product of the Invention | Martinal ® ON-310 |
| --- | --- | --- |
| Transparency (DIN 53147) | 34 | 27 |
| Opacity (DIN 53146) | 86 | 89 |
| Yellow Index (DIN 6167) | 13 | 19 |

The product of the invention thus showed improved whiteness, improved transparency and little or no yellow colouration imparted to the cured resin.

What is claimed is:

1. A process for the production of aluminium hydroxide of high whiteness, comprising the steps of (i) heating aluminium hydroxide obtained from the Bayer process having an average particle size of 20 to 200 μm to a temperature of 300 to 700° C. to form activated aluminum hydroxide;

(ii) dissolving the soluble fraction of the activated aluminium hydroxide at 85 to 275° C. in an aqueous solution containing sodium hydroxide to form a sodium aluminate liquor having a molar ratio of $Na_2O:Al_2O_3$ of 1.40 to 2.4 and containing an undissolved residue of very fine boehmite;

(iii) filtering said sodium aluminate liquor to obtain a clear solution of sodium aluminate supersaturated with respect to dissolved alumina;

(iv) cooling said clear solution of sodium aluminate to 50 to 80° C., and seeding with previously crystallized aluminium hydroxide to induce further crystallization and keeping at 50 to 80° C. for a period of time sufficient to achieve crystallization of a substantial amount of aluminium hydroxide; and (v) separating, washing and drying the produced aluminium hydroxide crystals.

2. The process of claim 1, wherein the aluminium hydroxide in step (i) is heated to a temperature of 350 to 450° C. for a time sufficient to obtain a product having a loss on ignition of 5 to 15%.

3. The process of claim 1, wherein the dissolution in step (ii) takes place at a temperature of 85 to 105° C.

* * * * *